Patented Jan. 23, 1940

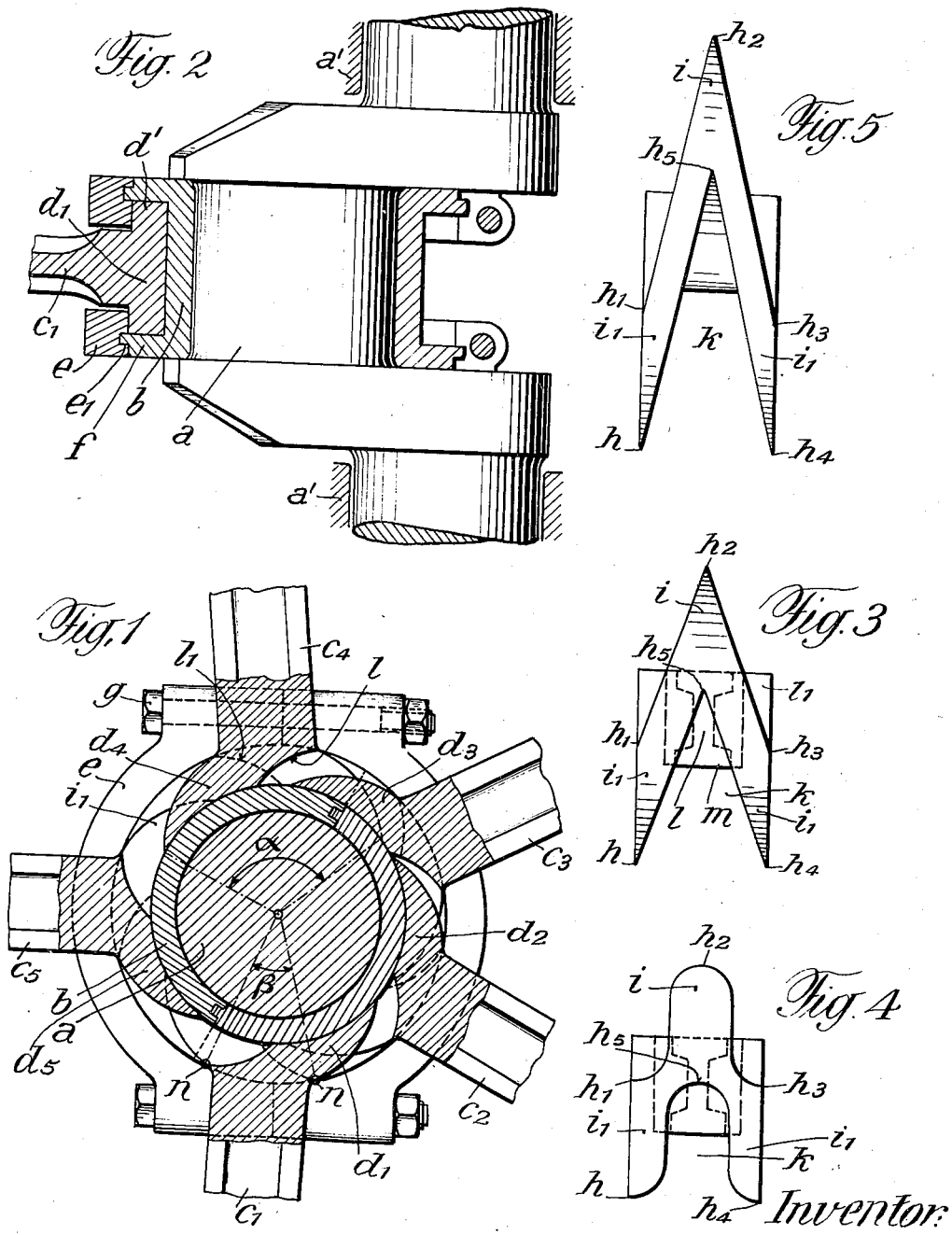

2,188,118

UNITED STATES PATENT OFFICE 2,188,118

RADIAL CONNECTING ROD ASSEMBLY

August Portmann, Winterthur, Switzerland, assignor to Schweizerische Lokomotiv-und Maschinenfabrik, Winterthur, Switzerland Application January 9, 1937, Serial No. 119,863
In Switzerland January 11, 1936

3 Claims. (Cl. 74—580)

This invention relates to radial connecting rod assemblies for piston operated machines.

With piston operated machines having a radial cylinder arrangement, it is known to provide direct cooperation with the crank pin only for one connecting rod, usually termed the master connecting rod of a radial cylinder arrangement correlated to the crank pin, and to pivotally connect the other or articulating connecting rods to the head of the master connecting rod. This construction has the drawback that the plunger associated with the master connecting rod is subjected to secondary pressure from its guide track surface, due to the thrusts acting on this rod through the articulating rods, and is thus additionally stressed in consequence of which more wear will ensue.

This drawback is intended to be avoided by means of a known proposal by the provision that all the connecting rods cooperating with the crankshaft at one point of its length engage with a bearing sleeve, which surrounds the crank pin rotatably in concentric relation and the heads of the rods are constructed as sliding pads bearing against the crank pin through the intermediary of a bearing sleeve serving as a guide means for said pads. These pads bear against a part-length of the sleeve circumference corresponding to the number of cylinders combined into the associated radial arrangement, two rings being arranged to encompass the pads so as to prevent the same form receding from the sleeve, i. e. the crank pin.

In arranging more than three connecting rods about one and the same crank pin, the angle at the centre of the crank pin corresponding to said part-length, becomes, however, too small for still providing safe guidance for maintaining the connecting rods in concentric relation with the crank pin, i. e. uniform bearing engagement with the sleeve.

According to the present invention the aforesaid drawbacks are eliminated in a radial connecting rod assembly in which the connecting rods cooperate with the crank pin in concentric relation and bear against the latter through the intermediary of a detachable sliding pad guide means rotatably mounted on the crank pin, by the provision, that the cylinders, which are associated with the entirety of connecting rods cooperating with the crankshaft at one point of its length, are united into one or more radial arrangements and that all these connecting rods cooperate concentrically with one and the same crank pin at right angles thereto and further that the sliding pads of the connecting rods are held in position on their guide means by rings that are secured to the latter so as to be positively prevented from shifting out of position.

By means of this arrangement is accomplished that the part-length along which the connecting rods bear against the crank pin in the circumferential direction through the intermediary of the sliding pad guide means is considerably increased. This results from the fact that this part-length, apart from special constructions that may be used for the slide surfaces of the sliding pads, no longer depends exclusively on the number of connecting rods cooperating with the crankshaft at one point of its length over the circumference of the crank pin in that the angle at the centre of the crank pin available for this purpose can be increased according to the number of radial arrangements applied into which the entirety of the associated cylinders is united.

Furthermore, to this arrangement the advantage is inherent that the same number of cylinders applicable to one and the same point in the length of the crankshaft by means of a radial cylinder arrangement comprising a master connecting rod and articulating connecting rods pivoted thereto, as referred to above, can be obtained with the aid of connecting rods the heads of which are constructed as sliding pads.

In the accompanying drawings two embodiments of the invention are illustrated by way of example only, in which Fig. 1 is a sectional view of a first embodiment of the radial connecting rod assembly, according to the invention, as seen axially of the crank pin;

Fig. 2 is an axial section of the same;

Figs. 3 to 5 show bottom views of three different sliding pads, each view indicating the slide surface of the respective pad;

Figure 6:
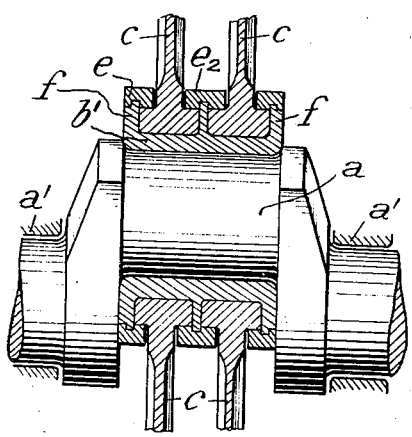
Fig. 6 shows an axial section of a second embodiment of the radial connecting rod assembly for connecting rods arranged in two different planes.

On the crank pin $a$ of a crankshaft mounted in bearings $a'$ (Figs. 1 and 2), a bearing sleeve $b$ is rotatably arranged against which connecting rods $c_1$—$c_5$ abut by means of sliding pads $d_1$—$d_5$ respectively which as may be seen from Fig. 2 have a width substantially equal to but not exceeding the diameter of the crank pin $a$. The cylinders of the piston operated machine and the plungers associated therewith and with the connecting rods $c_1$—$c_5$, that are pivotally connected to the plungers, are not shown in the drawings, the latter being assumed to form a radial arrangement about the crank pin $a$.

The sliding pads $d_1$—$d_5$ on the connecting rods $c_1$—$c_5$ are provided on both sides with ledges $d'$ and held in position on the sleeve $b$ by means of bi-partite rings $e$, axially overlying these ledges, as seen in the axial section of Fig. 2. The rings $e$ interengage with side flanges $f$ on the sliding pad guide sleeve $b$ by means of tongue and groove connections $e_1$, so that axial displacement of the rings in any direction during the operation is avoided. These side flanges, which overly the ledges $d'$, act as stiffener members for the sleeve $b$ and permit a sturdy construction of the tongue and groove connection $e_1$ and to keep the latter at a distance from the sleeve part of the sliding pad guide means $b$.

The bi-partite rings $e$ are advantageously so constructed that by tightening bolts $g$, passed through both parts thereof, the bi-partite sleeve $b$ is compressed so as to form a self-contained rigid unit together with these rings. By this means the advantage is obtained that pressures accruing from explosives and kinetic energies of movable parts are compensated to some extent by rigidity of the rigid unit $b$, $e$, so that the sleeve $b$ transmits but the resulting total effect of these thrusts to the crank pin $a$.

The sliding pads $d_1$—$d_5$, are shown in three different modifications in the Figs. 3 to 5, as their slide surfaces are seen from below. The slide surfaces are each limited by a contour line $h$, $h_1$, $h_2$, $h_3$, $h_4$, $h_5$, $h$. The central flap-like projection $i$ of each sliding pad interfits with the recess $k$ of the adjacent pad. In order to provide for an angle at the centre of the crank pin subtended by the individual sliding pad, and thus the part-length along which the pad bears against the sleeve $b$, as large as possible, the sliding pads are recessed at their portion beneath the shank of the connecting rod above, the recess representing a limiting surface as indicated by the line $l$ (in Fig. 1, at the rod $c_4$). Also the ledges $d'$ are recessed at their portions on both sides laterally beyond the shank of the rod, as indicated by the line $l_1$, which is also shown in Fig. 1, but in dotted fashion. This measure provides for the central flap $i$ of each sliding pad to enter the recess underneath the connecting rod adjoining the pad on the respective side, whereas the two flaps $i_1$ of the former sliding pad each enter a recess in one of the two ledges laterally of the shank of the connecting rod adjoining this sliding pad on the opposite side. The inner slide surface of the sliding pads subtends on the sleeve $b$ an angle $\alpha$ (Fig. 1), whereas the outer bearing surface of the pads subtends on the rings $e$ an angle $\beta$. The latter angle can somewhat be enlarged by spacing the points $n$ further apart (Fig. 1, at rod $c_1$).

In constructing the sliding pads as indicated in the Figs. 3 and 5, the angle subtended by the pads may be enlarged by varying the inclination of the limiting lines $h_1$, $h_2$ and $h_2$, $h_3$ to such an extent that for any feasible number of cylinders the sliding pads of the connecting rods can still be aligned in a single row circumferentially of the crank pin.

In applying the pad construction indicated in Fig. 4 the angle subtended by the pad can only be so much enlarged as this is necessary for a maximum of about six cylinders included in one and the same planar radial arrangement.

The sliding pads may obviously also be so constructed that the limiting surfaces $l$ and $l_1$ are radially directed which may, however, require reducing the angle subtended by the pad accordingly.

Figure 7:
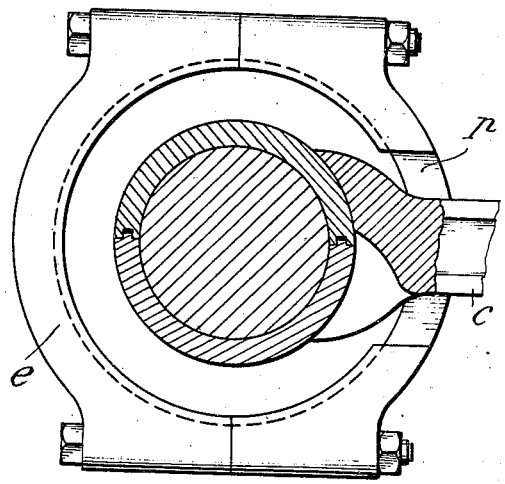
Fig. 7 is a corresponding radial section on a larger scale.
Figure 8:
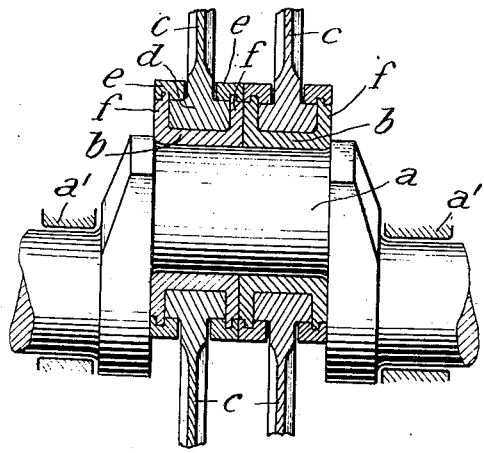
Fig. 8 shows a section similar to Fig. 6 of a variant construction.

In the Figs. 6 and 7 a radial connecting rod assembly is shown which is intended for combination with a dual radial cylinder arrangement, that is with two collateral radial cylinder arrangements cooperating with the crankshaft in one and the same point of this shaft. The connecting rods $c$ and $c^1$ are spaced apart a distance of the order of the width of a sliding pad and are situated in parallel planes at right angles to the crank pin and are held in position by two outer rings $e$, a central common ring $e_2$ and an interiorly disposed bearing sleeve $b'$ which is common to both radial cylinder arrangements. In this embodiment the combined widths of the sliding pads is substantially equal to but does not exceed the diameter of the crank pin. Instead of the common sleeve $b'$, two individual sleeves $b$ may be arranged side by side, as shown in Fig. 8, the two sleeves $b$ being clamped together by means of two retaining rings $e$ as evident from Fig. 2.

For disassembling the individual connecting rods only the ring $e_2$ need be removed, whereas the rings $e$ remain in place undisturbed, so that the connecting rods are retained for preventing them from dropping down into the crank chamber. At a point of their circumference the rings $e$ are provided with a recess $p$, as shown in Fig. 7, through which the connecting rods can be disassembled singly or consecutively one by one after the rings $e$ have each time been turned into the respective angular position.

Alternatively, the rings $e$, $e_2$ may be so constructed that for disassembling the rods the central ring $e_2$ which holds the rings in position, is provided with recesses $p$, whereas the two outer rings $e$, which are then given full cross sectional area throughout, must be removed.

Also in the construction of the rings, as shown in Fig. 2, one of the rings may be provided with a recess as indicated in Fig. 7.

In consequence of arranging the recesses $p$, one of the sliding pads is retained by a ring only on one side. When it is desired to avoid this, the retaining rings provided with recesses $p$ are used only for the assemblage and disassemblage of the connecting rods, thus as temporary expedients which are replaced for the operation by rings of full cross sectional area throughout.

The shanks of the connecting rods can be forked in the radial direction, whenever required, at their portions connecting with the sliding pads with a view to providing a corresponding transmission of thrust from the rods to the pads, i. e., for more uniformly distributing the pressure to the sliding pads.

This measure permits to increase the radial dimension of the central flap $i$.

I do not limit myself to the particular size, shape, number or arrangement of parts as shown and described, all of which may be varied without going beyond the scope of my invention as shown, described and claimed.

What I claim is:

1. In a connection between a plurality of connecting rods and a single crank pin, the connecting rods being distributed around the circumference of the crank pin in concentric relation to said pin within two complete angular ranges about said pin so as to form two sets of radial connecting rods, sliding pads arranged on the inner ends of said connecting rods, a terminally radially flanged guide sleeve common to both of said radial connecting rod arrangements and having a central radial flange rotatably mounted on said crank pin for said sliding pads to abut against the circumference of said sleeve, the total thickness of said flanges and the double pad width defining the length of said crank pin, and retaining rings encompassing said sliding pads adjacent said flanges for holding said pads to said guide sleeve, and an arcuate tongue and groove connection provided between said rings and said terminal flanges of said sleeve and establishing true radial and axial alignment between said rings and said guide sleeve.

2. In a connection between a plurality of connecting rods and a single crank pin, the connecting rods being distributed around the circumference of the crank pin in concentric relation to said pin within two complete angular ranges about said pin so as to form two sets of radial connecting rods, sliding pads arranged on the inner ends of said connecting rods, two independent terminally radially flanged guide sleeves for said two radial connecting rod arrangements disposed side by side with their inner terminal flanges adjoining each other rotatably mounted on said crank pin for said sliding pads to abut against the circumferences of said sleeves, the total thickness of said flanges and the width of the double pad defining the length of said crank pin, retaining rings encompassing said sliding pads adjacent said flanges for holding said pads to said guide sleeves and an arcuate tongue and groove connection provided between each of said rings and one of said flanges and establishing true radial and axial alignment between said rings and said guide sleeves.

3. In a radial connecting rod assembly a plurality of connecting rods, a crank pin, said connecting rods being distributed around the circumference of said crank pin in concentric relation to said pin within more than one complete angular range, sliding pads of a maximum width substantially equal to but not exceeding the diameter of said crank pin, radially flanged guide means slidably guiding said pads on said crank pin between said flanges in axial bearing engagement therewith, the total of the thickness of said flanges and the pad widths defining the length of said crank pin, retaining rings encompassing said sliding pads adjacent to said flanges for holding said pads to said guide means, and bearing surfaces provided between said retaining rings and said flanges for establishing true axial and radial alignment between said rings and said guide means.

AUGUST PORTMANN.